United States Patent [19]

Schade et al.

[11] Patent Number: 5,622,926
[45] Date of Patent: Apr. 22, 1997

[54] VINYLPYRROLIDONE AND VINYLIMIDAZOLE COPOLYMERS, THEIR PREPARATION AND THEIR USE IN DETERGENTS

[75] Inventors: Christian Schade, Ludwigshafen; Juergen Detering, Limburgerhof; Wolfgang Trieselt, Ludwigshafen, all of Germany

[73] Assignee: BASF Aktiengesellschaft, Ludwigshafen, Germany

[21] Appl. No.: 454,173

[22] PCT Filed: Dec. 17, 1993

[86] PCT No.: PCT/EP93/03598

§ 371 Date: Jun. 21, 1995

§ 102(e) Date: Jun. 21, 1995

[87] PCT Pub. No.: WO94/14861

PCT Pub. Date: Jul. 7, 1994

[30] Foreign Application Priority Data

Dec. 29, 1992 [DE] Germany ............... 42 44 386.5

[51] Int. Cl.⁶ ............... C11D 1/94; C11D 3/28
[52] U.S. Cl. ............ 510/340; 510/360; 510/405; 510/446; 510/480; 510/500; 525/47; 525/281; 525/412; 525/479; 525/279
[58] Field of Search ............. 252/94, 524, 143, 252/542, 174.23, 174.24; 510/340, 360, 405, 446, 480, 500; 525/47, 281, 412, 479, 279

[56] References Cited

U.S. PATENT DOCUMENTS

| | | | |
|---|---|---|---|
| 4,851,149 | 7/1989 | Carandang | 252/147 |
| 5,106,908 | 4/1992 | Alsmarraie et al. | 525/105 |
| 5,164,454 | 11/1992 | Suga et al. | 525/309 |
| 5,194,416 | 3/1993 | Jureller et al. | 502/167 |
| 5,205,960 | 4/1993 | Kristopeit et al. | 252/174.24 |
| 5,207,941 | 5/1993 | Kroner et al. | 252/174.23 |
| 5,247,040 | 9/1993 | Amick et al. | 526/286 |
| 5,256,739 | 10/1993 | Ono et al. | 525/412 |
| 5,274,028 | 12/1993 | Bertrand et al. | 525/17 |
| 5,364,907 | 11/1994 | Rolando et al. | 525/54.1 |
| 5,422,022 | 6/1995 | Chamberlain, III | 252/32.5 |

FOREIGN PATENT DOCUMENTS 1348212  3/1974  United Kingdom.

*Primary Examiner*—Paul Lieberman
*Assistant Examiner*—Gregory R. Delcotto
*Attorney, Agent, or Firm*—Oblon, Spivak, McClelland, Maier & Neustadt, P.C.

[57] ABSTRACT

Copolymers which are obtainable by free radical copolymerization of a mixture of (a) from 20 to 95% by weight of 1-vinylpyrrolidone, a 1-vinylimidazole or a mixture of 1-vinylpyrrolidone and/or 1-vinylimidazoles which may contain up to 20% by weight of other monoethylenically unsaturated monomers and (b) from 5 to 80% by weight of water-insoluble polymers which contain at least one ethylenically unsaturated double bond and/or one mercapto group in the molecule, processes for the preparation of the copolymers by copolymerization of the compounds of groups (a) and (b) in the abovementioned amounts in water, an alcohol, an ester or a ketone in the presence of free radical initiators, and the use of the copolymers thus obtainable and of copolymers of from 20 to 95% by weight of 1-vinylpyrrolidone or a mixture of 1-vinylpyrrolidone with up to 20% by weight of other monoethylenically unsaturated monomers and from 10 to 80% by weight of styrene as additives for detergents for inhibiting the dye transfer during the wash process, and detergents which contain the stated copolymers.

3 Claims, No Drawings

VINYLPYRROLIDONE AND VINYLIMIDAZOLE COPOLYMERS, THEIR PREPARATION AND THEIR USE IN DETERGENTS

The present invention relates to copolymers of 1-vinylpyrrolidone and 1-vinylimidazoles which can be prepared in the presence of water-insoluble polymers which contain at least one ethylenically unsaturated double bond and/or one mercapto group in the molecule, a process for the preparation of the copolymers by copolymerization of 1-vinylpyrrolidone and 1-vinylimidazoles in the presence of water-insoluble polymers which contain at least one ethylenically unsaturated double bond and/or one mercapto group in the molecule, in solvents, in the presence of free radical initiators, and the use of the copolymers which can be prepared in this manner and the copolymers of 1-vinylpyrrolidone and styrene as additives for detergents for inhibiting dye transfer during the wash process, and detergents which contain the stated copolymers.

DE-B-22 32 353 discloses detergent and cleaning agent mixtures which essentially consist of from 95 to 60% by weight of nonionic detergents and from 5 to 40% by weight of a partially or completely water-soluble polyvinylpyrrolidone and are essentially free of anionic surfactants. The polymers of vinylpyrrolidone prevent dye transfer from colored to white textiles during the wash process. The polymers of vinylpyrrolidone have molecular weights of from about 10,000 to about 1,000,000. Both homopolymers and copolymers of vinylpyrrolidone are suitable. Examples of useful comonomers are acrylonitrile or maleic anhydride. However, the efficiency of the vinylpyrrolidone polymers as dye transfer inhibitors is very adversely affected by anionic surfactants.

DE-A-28 14 287 discloses detergents and cleaning agents which contain anionic and/or nonionic surfactants, builders and other conventional detergent additives and, as discoloration-inhibiting additives, from 0.1 to 10% by weight of water-soluble or water-dispersible homo- or copolymers of N-vinylimidazole. The polymers have a specific viscosity of from 0.01 to 5 in 1% strength by weight aqueous solution at 20° C.

The abovementioned polymers have the disadvantage that they are neither biodegradable nor removable from the wastewater by adsorption on sewage sludge.

The object of the present invention is to provide novel substances and a process for the preparation of the novel substances. It is a further object of the present invention to provide a detergent additive which prevents dye transfer during the wash process and which can be eliminated from the wastewater at least partially by adsorption on the sewage sludge.

We have found that these objects are achieved by the copolymers which are obtainable by free radical copolymerization of a mixture of (a) from 20 to 95% by weight of 1-vinylpyrrolidone, a 1-vinylimidazole of the formula (I)

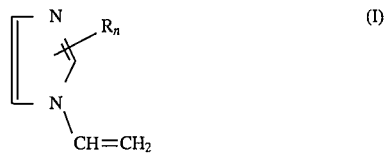

where R is H, $CH_3$ or $C_2H_5$ and n is from 1 to 3, a mixture of such 1-vinylimidazoles or a mixture of 1-vinylpyrrolidone and/or 1-vinylimidazoles of the formula I which contain up to 20% by weight of other monoethylenically unsaturated monomers, and (b) from 5 to 80% by weight of water-insoluble polymers which contain at least one ethylenically unsaturated double bond and/or one mercapto group in the molecule.

The present invention furthermore relates to a process for the preparation of copolymers, wherein (a) a 1-vinylpyrrolidone, a 1-vinylimidazole of the formula I, a mixture thereof or a mixture of 1-vinylpyrrolidone and/or 1-vinylimidazoles which contain up to 20% by weight of other monoethylenically unsaturated monomers, and (b) from 5 to 80% by weight of water-insoluble polymers which contain at least one ethylenically unsaturated double bond and/or one mercapto group in the molecule are polymerized in water, an alcohol, an ester or a ketone, each having a boiling point below 135° C., or a mixture of the stated solvents, in the presence of free radical initiators and in the presence or absence of protective colloids and surfactants.

The last-mentioned object is achieved, according to the invention, by the use of the abovementioned copolymers and by the use of copolymers of (a) from 20 to 95% by weight of 1-vinylpyrrolidone or a mixture of 1-vinylpyrrolidone with up to 20% by weight of other monoethylenically unsaturated monomers and (b) from 5 to 80% by weight of styrene as an additive for detergents for inhibiting dye transfer during the wash process and with detergents based on surfactants and, if required, builders and other conventional components, if the detergents contain from 0.1 to 10% by weight of a novel copolymer or of a copolymer of (a) from 20 to 95% by weight of 1-vinylpyrrolidone or a mixture of 1-vinylpyrrolidone with up to 20% by weight of other monoethylenically unsaturated monomers and (b) from 5 to 80% by weight of styrene.

Monomers of group (a) are 1-vinylpyrrolidone and 1-vinylimidazoles of the formula (I)

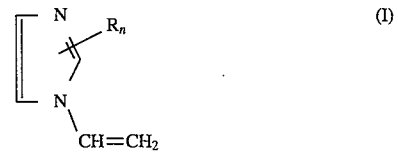

where R is H, $CH_3$ or $C_2H_5$ and n is from 1 to 3.

R may be in the 2-, 4- and 5-position of the imidazole ring, if R is methyl or ethyl, these groups may replace the 3 substitutable hydrogen atoms on the imidazole ring in the 2-, 4- and 5-position. Examples of suitable compounds are 1-vinylimidazole, 1-vinyl-2-methylimidazole, 1-vinyl-2,4-dimethylimidazole, 1-vinyl-2,4,5-trimethylimidazole, 1-vinyl-2-ethylimidazole, 1-vinyl-4,5-diethylimidazole and 1-vinyl-2,4,5-triethylimidazole. Mixtures of the stated monomers in any ratio can also be used, for example mixtures of 1-vinylpyrrolidone and 1-vinylimidazole or mixtures of 1-vinylimidazole and 1-vinyl-2-methylimidazole.

The monomers of group (a) can be used in the copolymerization either alone or as a mixture with one another and with up to 20% by weight of other monoethylenically unsaturated monomers. These are preferably monomers which contain a basic nitrogen atom, either in the form of free bases or in quaternized form, and monomers which have an amido group which may be substituted. Examples of suitable monomers of this type are N, N'-dialkylaminoalkyl (meth)acrylates, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, dimethylaminobutyl methacrylate, dimethylaminoneopentyl acrylate and dimethylaminoneopentyl methacrylate. Further suitable basic monomers of this group are N, N'-dialkylaminoalkyl(meth)acrylamides, eg. N, N'-di $C_1$–$C_3$-alkylamino-$C_2$–$C_6$-alkyl(meth)acrylamides, such as dimethylaminoethylacrylamide, dimethylaminoethylmethacrylamide, diethylaminoethylacrylamide, diethylaminoethylmethacrylamide, dipropylaminoethylacrylamide, dipropylaminoethylmethacrylamide, dimethylaminopropylacrylamide, dimethylaminopropylmethacrylamide, diethylaminopropylacrylamide, diethylaminopropylmethacrylamide, dimethylaminoneopentylacrylamide, dimethylaminoneopentylmethacrylamide and dialkylaminobutylacrylamide. Further suitable monomers of this group are 4-vinylpyridine, 2-vinylpyridine and/or diallyl(di)alkylamines in which the alkyl group is of 1 to 12 carbon atoms. The abovementioned basic monomers are used in the copolymerization in the form of the free bases or of the salts with organic or inorganic acids or in quaternized form. For example, carboxylic acids of 1 to 7 carbon atoms, eg. formic acid, acetic acid or propionic acid, benzenesulfonic acid, p-toluenesulfonic acid or inorganic acids, such as hydrohalic acids, for example hydrochloric acid or hydrobromic acid, are suitable for salt formation. The basic monomers stated above by way of example may also be used in quaternized form. For example, alkyl halides where the alkyl group is of 1 to 18 carbon atoms, eg. methyl chloride, methyl bromide, methyl iodide, ethyl chloride, propyl chloride, hexyl chloride, dodecyl chloride, lauryl chloride and benzyl halide, in particular benzyl chloride and benzyl bromide, are suitable for quaternization. The quaternization of the nitrogen-containing basic monomers can also be carried out by reacting these compounds with dialkyl sulfates, in particular diethyl sulfate or dimethyl sulfate. Examples of quaternized monomers of this group are trimethylammoniumethyl methacrylate chloride, dimethylethylammoniumethyl methacrylate ethylsulfate and dimethylethylammoniumethylmethacrylamide ethylsulfate. Further suitable monomers are 1-vinylimidazolium compounds of the formula

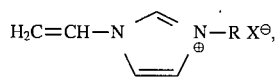

where R is H, $C_1$–$C_{18}$-alkyl or benzyl and $X^\ominus$ is an anion.

The anion may be a halogen ion or a radical of an inorganic or organic acid. Examples of quaternized 1-vinylimidazole of the formula I are 3-methyl-1-vinylimidazolium chloride, 3-benzyl-1-vinylimidazolium chloride, 3-n-dodecyl-1-vinylimidazolium bromide and 3-n-octadecyl-1-vinylimidazolium chloride.

If the abovementioned monomers are used together with vinylpyrrolidone or the vinylimidazoles, they are present in the mixture preferably in an amount of 1 to 18% by weight. The monomers of group (a) are used in the copolymerization in amounts of from 20 to 95, preferably from 30 to 90, % by weight.

Suitable components (b) which are used in the polymerization batch in an amount of from 5 to 80, preferably from 10 to 70, % by weight are water-insoluble polymers which contain at least one ethylenically unsaturated double bond and/or one mercapto group in the molecule. The average molecular weight $M_w$ of the water-insoluble polymers is, for example, at least 500, preferably from 800 to 200,000. The average molecular weight of some polymers of component (b) is above the stated range and cannot be definitively determined. This applies, for example, to the polybutadienes, some of which contain crosslinked structures.

The polymers (b) are water-insoluble. Water-insoluble is to be understood in this context as meaning a polymer which has a solubility of not more than 0.1% by weight in water.

The suitable polymers may have a vinyloxy, vinyl, allyl, acryloyl, methacryloyl, phenylvinyl or isopropenylphenyl unit as a terminal group. They may have different chemical structures and may be polycondensates, polyadducts or polymers, for example polyesters, polyamides, polytetrahydrofurans, polysiloxanes, epoxy resins, polyurethanes, polystyrenes, polyacrylates or polyisobutenes. Polymers (b) of this type are generally referred to in the literature as macromonomers. Such compounds are described in, for example, P. F. Rempp and E. Frank, Adv. Polym. Sci. 58 (1984), 1–53, or Y. Kawakami in Encycl. Polym. Sci. Engng. 9, 195–204, John Wiley: New York 1987. The polymers may also contain more than one of the vinyl terminal groups described. They are then often referred to as polymeric crosslinking agents. Other suitable polymers of group (b) are compounds which contain at least one C—C double bond in the main chain, for example polybutadienes or unsaturated polyesters.

The preparation of the polymers (b) is known to the skilled worker. For example, the compounds referred to as macromonomers can be obtained by initiating or terminating, by means of a vinyl-carrying reagent, a reaction synthesizing the polymer, the vinyl groups being incorporated in the polymer. For example, living anionic polymers of styrene or alkyl (meth)acrylates with allyl halides, p-chloromethylstyrene, (meth)acryloyl chloride, glycidyl methacrylate, 1-isopropenyl-3- [2-(methyl-2-isocyanato) ethyl] benzene or methacryloyl isocyanate can be reacted to give corresponding macromonomers. Correspondingly, hexamethylcyclotrisiloxane or octamethylcyclotetrasiloxane can be subjected to anionic polymerization with alkali metal alcoholates and then reacted with reactive methacrylic derivatives to give methacryloyl-terminated polydimethylsiloxanes. Another method which is possible in principle is to prepare a prepolymer having a defined terminal group by using suitable initiators, chain transfer agents or terminating reagents. The terminal group of the prepolymer is then reacted in a second stage with a vinyl-carrying compound, the vinyl group being retained. Polymerizations in the presence of thioglycolic acid lead, for example, to carboxyl-carrying polymers, which can then be esterified with hydroxyethyl methacrylate to give a macromonomer. Condensation and addition reactions likewise frequently lead to suitable prepolymers which have a defined content of reactive groups. Polymeric crosslinking agents can be obtained in a similar manner to these compounds which are referred to as macromonomers. Most frequently, a bi- or monofunctional polymer is reacted with a suitable vinyl compound for this purpose. For example, polymeric diols and diamines can be converted into the corresponding (meth)acrylates or (meth)acrylamides by means of a (meth)acrylic compound. Polydimethylsiloxanes can be obtained, for example, by a corresponding reaction through terminal OH groups and can then be converted into the corresponding methacrylates.

Other suitable polymers of group (b) are polycondensates or polyadducts which are prepared partially from ethylenically unsaturated building blocks and in which at least one double bond is retained in the polymer. Examples of such polymers are polyesters or polyamides, each of which have been obtained with the partial use of monoethylenically unsaturated dicarboxylic acids, such as maleic acid, itaconic acid or fumaric acid. Further suitable unsaturated polyesters can also be obtained by the partial use of an unsaturated diol, such as but-2-ene-1,4-diol. Suitable polycondensates are also obtainable by the partial use of unsaturated carboxylates and carboxamides in the reaction with saturated carboxylates, lactones, carboxamides and lactams. Examples of such compounds are copolyesters with ricinoleic acid. The preparation of the polyesters and polyamides is known to the skilled worker. They are obtainable, for example, by cocondensation of saturated dicarboxylic acids, such as aliphatic dicarboxylic acids having 2 to 12 carbon atoms in the molecule, for example succinic acid and adipic acid, and aromatic dicarboxylic acids, such as phthalic acid, isophthalic acid and terephthalic acid, with unsaturated dicarboxylic acids, such as maleic acid, fumaric acid or itaconic acid, and diols, such as aliphatic diols, for example ethylene glycol, propylene glycol, butanediol, hexanediol and neopentyldiglycol, polyethylene glycols, polytetrahydrofurans and aromatic diols, such as di(hydroxyphenyl)dimethylmethane and dihydroxydiphenyl sulfone, or diamines, such as aliphatic diamines, for example ethylenediamine or propylenediamine, hexamethylenediamine and 4,4'-diaminodicyclohexyldiamine, diamines of polyethylene glycol and aromatic diamines, such as p- and m-phenylenediamine. The dicarboxylic acids can be used both in this form and in the form of anhydrides or esters. Unsaturated polyesters which contain maleic acid, fumaric acid, itaconic acid or but-2-ene-1,4-diol groups are particularly preferred. Further suitable polymers of group (b) are homo- and copolymers of isoprene, butadiene or norbornene. Homopolymers of butadiene or copolymers which contain butadiene together with other comonomers, such as styrene, acrylonitrile, acrylates of alcohols of 1 to 8 carbon atoms, such as ethyl acrylate, butyl acrylate and ethylhexyl acrylate, isoprene, vinyl ethers where the alkyl chain is of 1 to 18 carbon atoms and acrylic acid, as polymerized units are particularly preferred. Such polymers are obtainable by various ionic, metal-catalyzed or free radical processes, for example polybutadiene oils by anionic polymerization, or the styrene/butadiene copolymers often referred to as synthetic rubbers by polymerization in aqueous dispersion.

Suitable components (b) are also all water-insoluble polymers which contain at least one mercapto group in the molecule. The mercapto groups or thiol groups may be present as terminal groups or in a side chain in the polymer. The polymer itself may have different chemical structures and comprise polycondensates, polyadducts or polymers. Examples are mercaptoalkyl-carrying polysiloxanes, for example co(dimethylsiloxy)[(mercaptopropyl)methylsiloxane]containing from 1 to 10 mol % of mercaptopropyl(methyl)siloxy groups.

Further examples of compounds of component (b) are bis(thiol)polytetrahydrofurans or copolymers of monoethylenically unsaturated carboxylic acids which have been reacted with thioalkanols, such as mercaptoethanol, mercaptopropanol, mercaptobutanol, glyceryl dithioglycolate, thiodiglycol, ethylthioethanol, dodecylthioethanol, ethoxylated alkylmercaptans and methylmercaptoethanol, or thioalkylamines, such as 2-amino-5-mercaptothiadiazole, aminomercaptoethane and aminomercaptopropane. The thioalkanols or thioalkanamines are present in either esterified or amidated form. The copolymers are derived, for example, from acrylic acid, methacrylic acid, maleic acid or itaconic acid. Suitable comonomers are styrene, 1-alkenes of 4 to 30 carbon atoms, isobutene, vinylalkyl ethers of 1 to 18 carbon atoms in the molecule and alkyl (meth)acrylates having 1 to 18 carbon atoms in the molecule.

The novel copolymers are prepared by copolymerizing (a) from 20 to 95% by weight of 1-vinylpyrrolidone, a 1-vinylimidazole of the abovementioned formula I, a mixture thereof or a mixture of 1-vinylpyrrolidone and/or 1-vinylimidazoles which contains up to 20% by weight of other monoethylenically unsaturated monomers and (b) from 5 to 80% by weight of water-insoluble polymers which contain at least one ethylenically unsaturated double bond and/or one mercapto group in the molecule, in water, an alcohol, an ester or ketone, each having a boiling point below 135° C, or a mixture of the stated solvents, in the presence of free radical initiators in the presence or absence of protective colloids and surfactants. The copolymerization of components (a) and (b) can be carried out by all methods of solution, emulsion or precipitation polymerization. The concentration of components (a) and (b) in the stated solvents is not critical and is advantageously from 1 to 80, preferably from 20 to 60, % by weight. Examples of suitable solvents are methanol, ethanol, isopropanol, n-propanol, n-butanol, isobutanol, tert-butanol, methyl acetate, ethyl acetate, isopropyl acetate, n-propyl acetate, methyl propionate, ethyl propionate, methyl ethyl ketone, acetone and diethyl ketone. The alcohols, ketones and esters should preferably have a boiling point below 135° C. The organic solvents are distilled off after the end of the copolymerization so that a powder copolymer is obtained, or are exchanged for water so that an aqueous dispersion of the copolymers is obtained.

The copolymers can also preferably be prepared by copolymerizing components (a) and (b) in water. In many cases, it is advisable to carry out the copolymerization in the presence of conventional amounts of protective colloids, for example from 0.5 to 5% by weight, or surfactants in amounts of from 1 to 10% by weight. In some cases, it may also be advantageous initially to prepare the water-insoluble polymers of group (b) by a known method in aqueous dispersion and then to add a monomer of the group (a) or a mixture of monomers of group (a). However, the copolymerization of components (a) and (b) can also be carried out by first taking a small amount of a mixture of components (a) and (b) in a polymerization container, initiating the copolymerization by adding an initiator and then adding components (a) and (b) batchwise or continuously in the desired ratio. However, it is also possible initially to take the total amount of component (b) and to add the monomers (a) batchwise or continuously. However, the monomers (a) may also first be polymerized substantially, ie. by up to 50%, and the polymers of group (b) added thereafter in order to obtain novel copolymers.

The copolymerization is carried out in the presence of initiators which form free radicals under the polymerization conditions. Suitable free radical initiators are all conventional peroxy and azo compounds, for example peroxides, hydroperoxides and peroxyesters, such as hydrogen peroxide, dibenzoyl peroxide, di-tert-butyl peroxide, tert-butyl hydroperoxide, tert-butyl perpivalate and tert-butyl peroxy-2-ethylhexanoate, and azo compounds, for example 2,2'-azobis(2-amidinopropane) dihydrochloride, 2,2'-azobis(2-methylbutyronitrile) and 2,2'-azobis[2-(2-imidazolin-2-yl)-propane]dihydrochloride. It is of course also possible to use initiator mixtures or the known redox initiators. The polymerization temperature is preferably from 60° to 100° C. Polymerization can of course also be effected outside this temperature range, the polymerization also being carried out at higher temperatures, for example from 120° to 140° C., in pressure-tight apparatuses. The initiators are used in conventional amounts, for example from 0.2 to 5% by weight, based on the monomers to be polymerized.

The novel copolymers can be freed from undesirable impurities by further process steps, such as steam treatment or partially distilling off the solvent used together with other volatile components. They may be subjected to further physical treatment steps, such as drying, filtration or dispersing processes.

The novel copolymers have K values of from 10 to 350, preferably from 12 to 90 (determined according to H. Fikentscher in 1% strength solution in ethanol or N-methylpyrrolidone at 25° C. and pH 7). In cases where the compounds of component (b) have crosslinked structures, for example in the case of polybutadiene dispersions or certain polyesters, a K value determination is not possible. The molecular weights in such cases are above 200,000.

Copolymers of 1-vinylpyrrolidone and styrene are known. They are usually prepared by copolymerizing vinylpyrrolidone and styrene. Copolymers of vinylpyrrolidone and styrene which are suitable for the desired application are also obtainable by grafting 1-vinylpyrrolidone onto a homopolymer of styrene or grafting styrene onto a homopolymer of 1-vinylpyrrolidone. As in the free radical copolymerization of styrene and 1-vinylpyrrolidone, this gives copolymers having block structures which contain blocks of polymerized styrene and 1-vinylpyrrolidone.

The copolymers described above and comprising the components (a) and (b) and the copolymers of 1-vinylpyrrolidone and styrene are used as additives for detergents, for inhibiting dye transfer during the wash process. The detergents may be in the form of a powder or a liquid formulation. The compositions of the detergent and cleaning agent formulations may be very different. Detergent and cleaning agent formulations usually contain from 2 to 50% by weight of surfactants and, if required, builders. These data apply to both liquid and powder detergents. Detergent and cleaning agent formulations which are commonly used in Europe, in the USA and in Japan are tabulated, for example, in Chemical and Engn. News 67 (1989), 35. Further information on the composition of detergents and cleaning agents appear in WO-A-90/13581 and Ullmanns Encyklopädie der technischen Chemie, Verlag Chemie, Weinheim 1983, 4th Edition, pages 63–160. The detergents can, if required, also contain bleach, for example sodium perborate, which, when used, may be present in the detergent formulation in amounts of up to 30% by weight. The detergents and cleaning agents can, if required, contain further conventional additives, for example complexing agents, turbidity agents, optical brighteners, enzymes, perfume oils, other dye transfer inhibitors, antiredeposition agents and/or bleach activators.

Detergents based on surfactants and, if desired, builders and other conventional components contain the novel copolymers of the components (a) and (b) or copolymers of (a) from 20 to 95% by weight of 1-vinylpyrrolidone or a mixture of 1-vinylpyrrolidone with up to 20% by weight of other monoethylenically unsaturated monomers and (b) from 5 to 80% by weight of styrene in amounts of from 0.1 to 10, preferably from 0.25 to 5, % by weight.

The copolymers act as dye transfer inhibitors in the washing of colored and white textiles.

In the Examples which follow, percentages are by weight. The K values were determined according to H. Fikentscher, Cellulosechemie 13(1932), 58–64 and 71–74, in 1% strength solution in ethanol (Examples 8 and 9 and copolymers 3 and 4 in 1% strength solution in N-methylpyrrolidone) at 25° C. in each case and at a pH of 7 in each case.

EXAMPLES

The following polymers were used as component (b):
Polymer (b) No. 1

Methacryloyl-terminated polydimethylsiloxane having an average molecular weight ($M_w$) of 5,000, commercial product from Toa Gosei Chem. Ind., Japan, under the name Makromonomer AK5.
Polymer (b) No. 2

Polydimethylsiloxane carrying 1.9 mol % of (mercaptopropyl)methyl groups and having a kinematic viscosity of 150 ctsk (determined at 20° C. Ubbelohde viscometer), commercial product from ABCR GmbH, Germany, with the name PS 849.
Polymer (b) No. 3

Methacryloyl-terminated condensate of bisphenol A and epichlorohydrin in a molar ratio of 1:1, having a molecular weight ($M_w$) of 1,000, bisphenol A/vinyl ester resin from BASF Aktiengesellschaft, Germany, with the trade name Palatal A 431-01.
Polymer (b) No. 4

Linear polybutadiene having an average molecular weight ($M_w$) of 1,800.
Polymer (b) No. 5

Polycondensate of adipic acid/itaconic acid/ethylene glycol in a molar ratio of 9: 1: 10, having an average molecular weight ($M_w$) of 2,000. Polymer (b) No. 6

Bis(mercapto)-terminated polytetrahydrofuran having an average molecular weight ($M_w$) of 1,200.

EXAMPLE 1

70 g of ethanol were initially taken in a 1,000 ml flask equipped with a stirrer and an apparatus for working under nitrogen and were heated to 78° C. under a nitrogen atmosphere. As soon as this temperature was reached, a feed comprising 40 g of ethanol, 90 g of 1-vinylpyrrolidone and 10 g of polymer (b) No. 1 was added dropwise in the course of 2 hours and a further feed comprising 40 g of ethanol and 1 g of dimethyl 2,2'azobisisobutyrate was added dropwise in the course of 4 hours. After the addition of the polymerization initiator, the reaction mixture was stirred for a further 3 hours at 78° C. and then subjected to steam distillation. A cloudy solution having a solids content of 47% was obtained. The K value of the polymer was 52.

EXAMPLE 2

Example 1 was repeated, with the only exception that 10 g of polymer (b) No. 2 were now used instead of polymer (b) No. 1. A cloudy solution having a solids content of 25% was obtained. The polymer had a K value of 41.

EXAMPLE 3

Example 1 was repeated, with the only exception that 10 g of polymer (b) No. 3 were now used instead of polymer (b) No. 1. A cloudy solution having a solids content of 40% was obtained. The copolymer had a K value of 57.

EXAMPLE 4

Example 1 was repeated, with the exception that 70 g of 1-vinylimidazole were now used instead of vinylpyrrolidone and 30 g of polymer (b) No. 4 were now used instead of polymer (b) No. 1. A white polymer dispersion having a solids content of 27% was obtained. The copolymer had a K value of 53.

EXAMPLE 5

Example 1 was repeated, with the exception that 33 g of 1-vinylpyrrolidone and 67 g of polymer (b) No. 4 were now used. A white polymer dispersion having a solids content of 64% was obtained. The copolymer had a K value of 37.

EXAMPLE 6

Example 1 was repeated, but 70 g of 1-vinylpyrrolidone and 30 g of polymer (b) No. 5 were used. A white polymer dispersion having a solids content of 62% was obtained. The copolymer had a K value of 57.

EXAMPLE 7

73 g of 1-vinylpyrrolidone, 90 g of 70% aqueous isopropanol and 8 g of polymer (b) No. 6 were initially taken in a 1,000 ml flask equipped with a stirrer and an apparatus for working under nitrogen and were heated to 55° C. under a nitrogen atmosphere. As soon as this temperature was reached, 1.5 g of 2,2'-azobis(N,N'-dimethyleneisobutyramide) dihydrochloride in 20 ml of water were added. After the addition of the initiator, the polymerization mixture was stirred for 140 minutes at 55° C. Thereafter, a further 0.3 g of the initiator in 10 ml of water was added and the reaction mixture was stirred for a further 180 minutes at 55° C. and then subjected to steam distillation. An opaque solution having a solids content of 19% was obtained. The K value of the polymer was 33.

Preparation of known copolymers of vinylpyrrolidone and styrene
Copolymer 1

80 g of 1-vinylpyrrolidone and 20 g of styrene were polymerized by the method stated in Example 1. An aqueous dispersion having a solids content of 28% was obtained. The copolymer had a K value of 66.
Copolymer 2

70 g of 1-vinylpyrrolidone, 20 g of styrene and 10 g of 3-methyl-1-vinylimidazolium chloride were polymerized by the method stated in Example 1. An aqueous polymer dispersion having a solids content of 43% was obtained. The copolymer had a K value of 30.

Comparative Example 1

Preparation of a random copolymer of 1-vinylpyrrolidone and ethyl acrylate 70 g of ethanol were initially taken in the apparatus described in Example 1 and heated to 78° C. in a stream of nitrogen. After this temperature was reached, a feed comprising 40 g of ethanol, 60 g of 1-vinylpyrrolidone and 40 g of ethyl acrylate was added dropwise in the course of 2 hours and a further feed comprising 40 g of ethanol and 1 g of dimethyl 2,2'-azobisisobutyrate was added dropwise in the course of 4 hours. The reaction mixture was stirred for a further 3 hours after the end of the addition of the initiator at 78° C. and then subjected to steam distillation. A white polymer dispersion having a solids content of 47% was obtained. The copolymer had a K value of 47.

Copolymer 3

200 g of demineralized water, 100 g of 1-vinylpyrrolidone, 2 g of polyvinylpyrrolidone having a K value of 30 and 3 g of emulsifier 1 (ester of sulfuric acid with an adduct of 2 mol of ethylene oxide with 1 mol of lauryl alcohol, was neutralized with sodium hydroxide solution) were heated to 75° C. under a nitrogen atmosphere in a flask equipped with a stirrer and an apparatus for working under nitrogen. After this temperature was reached, a feed comprising a mixture of 100 g of styrene, 100 g of water and 7 g of emulsifier 1 was added dropwise in the course of 3 hours and at the same time a further feed comprising a solution of 2 g of sodium persulfate in 50 g of water was added dropwise in the course of 5 hours. After the feed had been added for 1 hour, the reaction temperature increased to 95° C. and the reaction mixture was stirred for a further 8 hours altogether at this temperature and then subjected to steam distillation for 2 hours. A dispersion having a solids content of 26% was obtained. The copolymer had a K value of 47.

Copolymer 4

325 g of demineralized water, 30 g of polyvinylpyrrolidone having a K value of 30, 85 g of styrene, 1.25 g of emulsifier 1, 1 g of emulsifier 2 (adduct of 11 mol of ethylene oxide with 1 mol of a $C_{13}/C_{15}$ fatty alcohol) and 0.5 g of potassium peroxodisulfate were initially taken in the apparatus described in Example 8 and stirred under a nitrogen atmosphere for 2 hours at 80° C. Thereafter, 4.5 g of emulsifier 2 were added and then a mixture of 45 g of styrene and 45 g of 1-vinylpyrrolidone and a solution of 0.5 g of potassium peroxodisulfate in 20 g of water were added simultaneously in the course of 2 hours. The reaction mixture was stirred for a further 2 hours at 80° C. and then filtered through a linen cloth. A white dispersion having a solids content of 36% and a mean particle diameter of 134 nm was obtained.

EXAMPLE 8

In an apparatus provided with a stirrer and for working under nitrogen, 150 g of demineralized water, 5 g of 1-vinylpyrrolidone and 50 mg of 2,2'-azobis(amidinopropane) dihydrochloride were added to 125 g of a polybutadiene dispersion having a solids content of 40% and a mean particle size of 90 nm, according to DE-C-24 27 960, and the mixture was heated to 65° C. under a nitrogen atmosphere. At this temperature, 45 g of 1-vinylpyrrolidone were then added dropwise in the course of 1.5 hours and at the same time 1 g of 2,2'-azobis(amidinopropane) dihydrochloride in 30 ml of water was added dropwise in the course of 2 hours. After a total of 3 hours after the beginning of the feeds, the temperature of the reaction mixture was increased to 70° C. for 2 hours. The reaction mixture was then subjected to steam distillation for 2 hours. A white dispersion having a solids content of 24% was obtained. The copolymer had a K value of 53.

EXAMPLE 9

110 g of a butadiene/styrene dispersion stabilized with 4 g of potassium oleate and having a butadiene/ styrene ratio of 3 : 1, a solids content of 47% and a mean particle size of 70 mm and 5 g of 1-vinylpyrrolidone were initially taken in the apparatus stated in Example 10 and were heated to 70° C. under a nitrogen atmosphere. As soon as the reaction mixture had reached this temperature, 45 g of 1-vinylpyrrolidone and 50 ml of water were added in the course of 2 hours and, separately from this, a solution of 1 g of 2,2'-azobis(amidinopropane) dihydrochloride in 30 ml of water was added in the course of 3 hours. The reaction mixture was stirred for a further 3 hours at 70° C. after the end of the addition of the initiator and then subjected to steam distillation. A white dispersion having a solids content of 17% was obtained. The copolymer had a K value of 44. Adsorption test The adsorption behavior of the polymers stated in Table 1 on activated sludge from a biological wastewater treatment plant is tested. The polymer is dissolved in each case in an aqueous activated sludge suspension. The concentration of the polymer is at least 100 mg/l, based on the dissolved organic carbon (DOC). The activated sludge concentration is 1 g/l, based on the dry weight. After 48 hours, the DOC is measured in the supernatant solution after the sludge has settled out. Fine activated sludge particles are removed before the DOC measurement.

$$\text{Degree of elimination in \%} = \frac{DOC \text{ (initial value)} - DOC \text{ (final value)}}{DOC \text{ (initial value)}} \times 100$$

The following results were obtained:

TABLE 1

| Polymer prepared according to Example | Degree of elimination |
|---|---|
| 4 | 53 |
| Copolymer 1 | 37 |
| 8 | 59 |
| 9 | 41 |
| Polyvinylpyrrolidone (K value 30) | <5 |

The textile samples were colored with the following dyes:

C.I. Direct Black 51 (constitution number 27720), C.I. Direct Blue 218 (24401), C.I. Direct Red 79 (29065), C.I. Direct Black 22 (35435), C.I. Direct Blue 71 (34140), C.I. Reactive Black 5 (20505).

| Washing conditions | |
|---|---|
| Washing apparatus | Launderometer |
| Wash cycles | 1 |
| Temperature | 60° C. |
| Duration of washing | 30 min |
| Water hardness | 3 mmol $Ca^{2+}$, $Mg^{2+}$ (4:1)/l |
| Test fabric | Cotton |
| Liquor ratio | 1:50 |
| Amount of liquor | 250 ml |
| Detergent concentration | 7.0 g/l |
| Detergent composition [%] | |
| Zeolite A | 20 |
| Sodium carbonate | 11 |
| Dodecylbenzenesulfonate | 5 |
| Soap | 1.3 |
| $C_{13}/C_{15}$ oxo alcohol × 7 ethylene oxide units | 3.9 |
| Acrylic acid/maleic acid copolymer 70/30, Na salt, MW = 70,000 | 2.7 |
| Sodium carboxymethylcellulose | 0.4 |
| Water | 7.0 |
| Polymer according to Table 2 | 1.0 |
| Sodium sulfate | to 100 |

TABLE 2

| Polymer prepared according to Example: | 1 | 2 | 3 | 4 | 5 | 6 | 7 | 8 | 9 | Copolymer 1 | Copolymer 2 | Copolymer 3 | Copolymer 4 | Comparative Example 1 |
|---|---|---|---|---|---|---|---|---|---|---|---|---|---|---|
| Direct Black 51 | 31.1 | 30.4 | 33.7 | 32.8 | 26.2 | 24.9 | 35.7 | 27.7 | 30.1 | 25.7 | 29.3 | 26.5 | 25.8 | 10.8 |
| Direct Blue 218 | 29.4 | 34.4 | 30.5 | 89.0 | 23.2 | 34.8 | 38.2 | 32.0 | 22.7 | 18.5 | 31.2 | 24.2 | 28.9 | 10.8 |
| Direct Red 79 | 78.8 | 84.0 | 80.6 | 85.2 | 71.8 | 73.3 | 82.2 | 78.6 | 68.2 | 69.6 | 70.3 | 69.3 | 64.1 | 31.2 |
| Direct Black 22 | 76.6 | 79.3 | 81.0 | 80.9 | 74.3 | 71.1 | 82.3 | 73.4 | 71.1 | 79.5 | 78.4 | 75.8 | 68.6 | 27.8 |
| Direct Blue 71 | 96.9 | 97.2 | 97.1 | 97.5 | 90.7 | 91.7 | 97.6 | 96.1 | 91.9 | 93.8 | 92.7 | 91.2 | 91.7 | 43.6 |

The Examples show that the novel polymers exhibit substantially improved elimination behavior in sewage sludge than polyvinylpyrrolidone.
Use Examples
Washing tests To test the efficiency, white test fabric was washed together with colored textile samples of cotton in a launderometer. The dye transfer which occurred was measured photometrically. The particular depths of color were determined from the reflectance values measured on the individual test fabrics, and the efficiency of the polymers can be derived from the said depths of color. An efficiency of 100% means that the test fabric retained its original depth of color, ie. it was not colored. An efficiency of 0% is determined in the case of a test fabric which has the same depth of color as a test cloth which was washed without the addition of a dye transfer-inhibiting additive.

The results in Table 2 show that the novel polymers have substantially higher efficiency than comparable polymers having a similar proportion of a less water-soluble component, for example Comparative Example 1.

We claim:

1. A copolymer which is obtainable by free radical copolymerization of a mixture of (a) from 20 to 95% by weight of a 1-vinylimidazole of the formula (I)

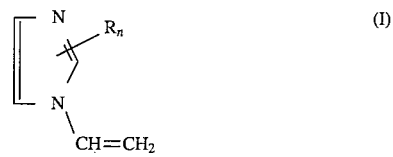

where R is H, $CH_3$ or $C_2H_5$ and n is from 1 to 3, or a mixture of 1-vinylimidazoles of the formula I which contains up to 20% by weight of other monoethylenically unsaturated monomers, and (b) from 5 to 80% by weight of water-insoluble polymers selected from the group consisting of unsaturated polyesters; homopolymers of butadiene; copolymers of butadiene with styrene, acrylonitrile, acrylates of alcohols of 1 to 8 carbon atoms, isoprene, vinyl ethers where the alkyl chain is of 1 to 18 carbon atoms and acrylic acid; mercaptoalkyl-carrying polysiloxanes; and bis(thiol)polytetrahydrofurans.

2. A process for the preparation of a copolymer as claimed in claim 1, which comprises copolymerizing (a) from 20 to 95% by weight of a 1-vinylimidazole of the formula I, a mixture of r a 1-vinylimidazole which contains up to 20% by weight of other monoethylenically unsaturated monomers and (b) from 5 to 80% by weight of water-insoluble polymers selected from the group consisting of unsaturated polyesters, homopolymers of butadiene, copolymers of butadiene with styrene, acrylonitrile, acrylates of alcohols of 1 to 8 carbon atoms, isoprene, vinyl ethers where the alkyl chain is of 1 to 18 carbon atoms and acrylic acid; mercaptoalkyl-carrying polysiloxanes and bis(thiol)polytetrahydrofurans in water, an alcohol, an ester or a ketone, each having a boiling point below 135° C., or a mixture of the stated solvents, in the presence of free radical initiators and in the presence or absence of protective colloids and surfactants.

3. A detergent comprising surfactants, builders, and other conventional components, which contains from 0.1 to 10% by weight of a copolymer prepared by free radical copolymerization of a mixture of (a) from 20 to 95% by weight of 1-vinylpyrrolidone, a 1-vinylimidazole of the formula (I)

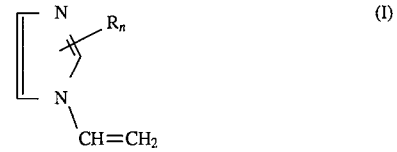

where R is H, $CH_3$ or $C_2H_5$ and n is from 1 to 3, a mixture thereof or a mixture of 1-vinylpyrrolidone or 1-vinylimidazoles of the formula I which contains up to 20% by weight of other monoethylenically unsaturated monomers, and (b) from 5 to 80% by weight of water-insoluble polymers selected from the group consisting of unsaturated polyesters; homopolymers of butadiene; copolymers of butadiene with styrene, acrylonitrile, acrylates of alcohols of 1 to 8 carbon atoms, isoprene, vinyl ethers where the alkyl chain is of 1 to 18 carbon atoms and acrylic acid; mercaptoalkyl-carrying polysiloxanes; and bis (thiol) polytetrahydrofurans, which contain at least one ethylenically unsaturated double bond or one mercapto group in the molecule.

* * * * *